R. B. BENJAMIN.
ILLUMINATING DEVICE.
APPLICATION FILED JAN. 18, 1916.
1,352,777.
Patented Sept. 14, 1920.
3 SHEETS—SHEET 1.
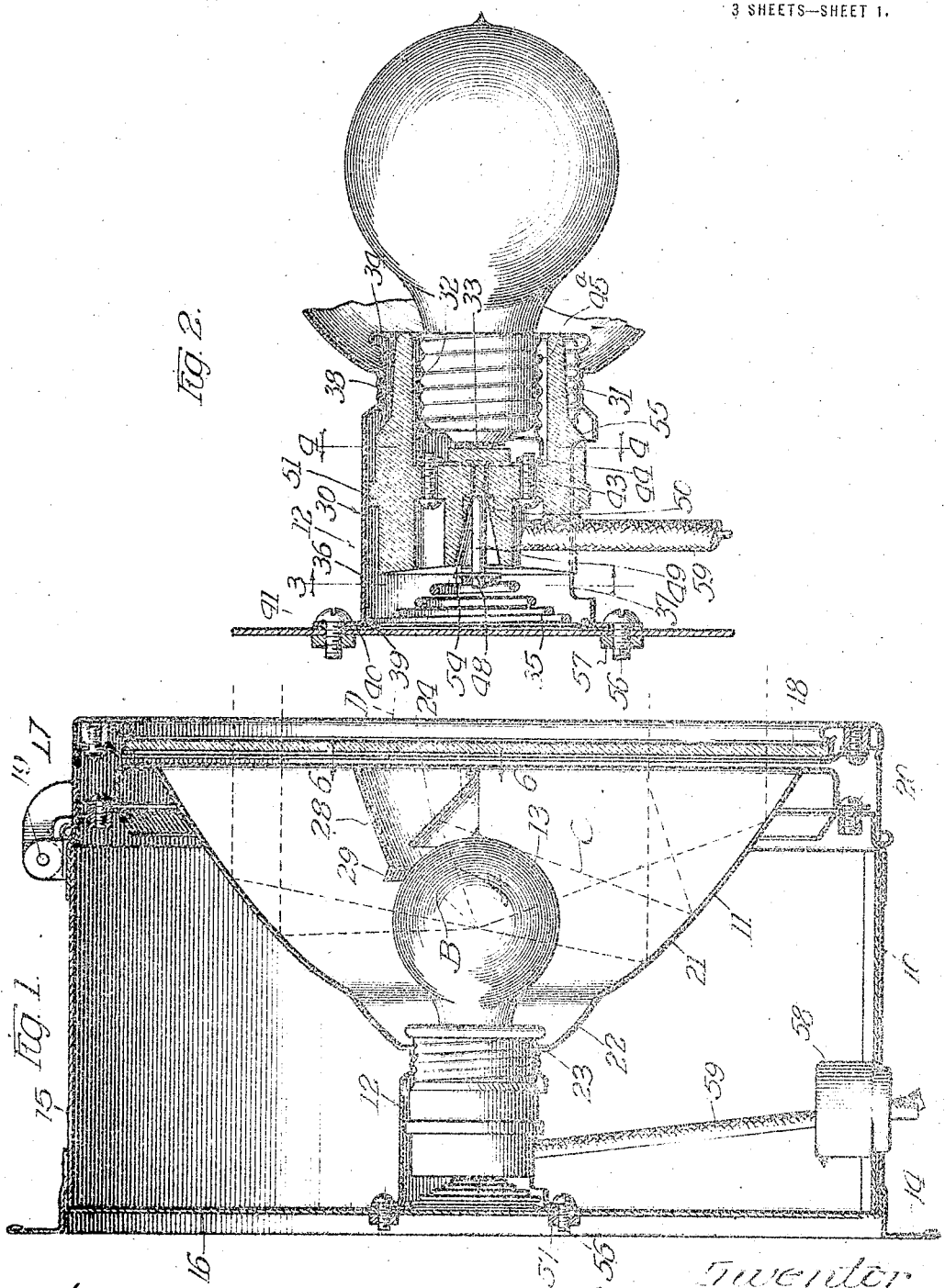

R. B. BENJAMIN.
ILLUMINATING DEVICE.
APPLICATION FILED JAN. 18, 1916.

1,352,777. Patented Sept. 14, 1920.
3 SHEETS—SHEET 2.

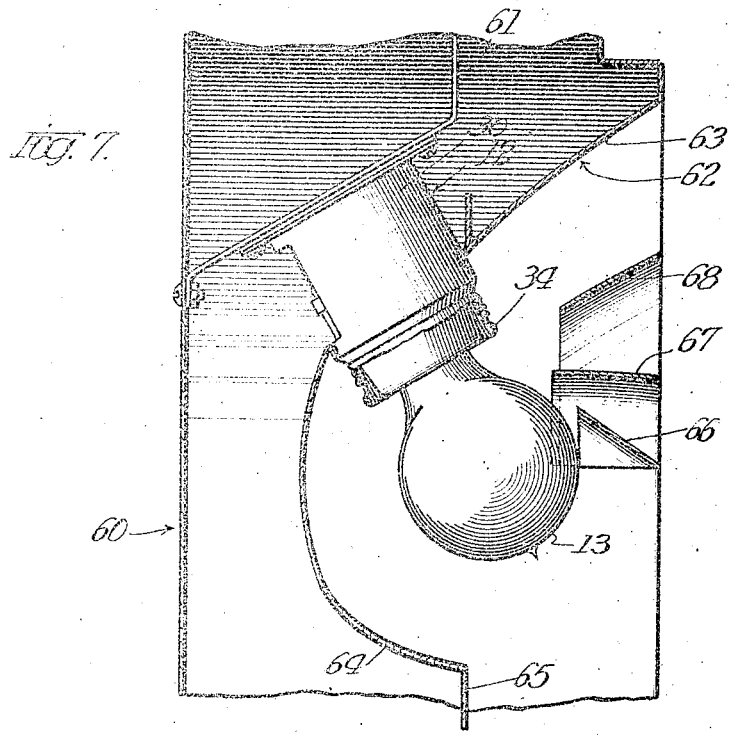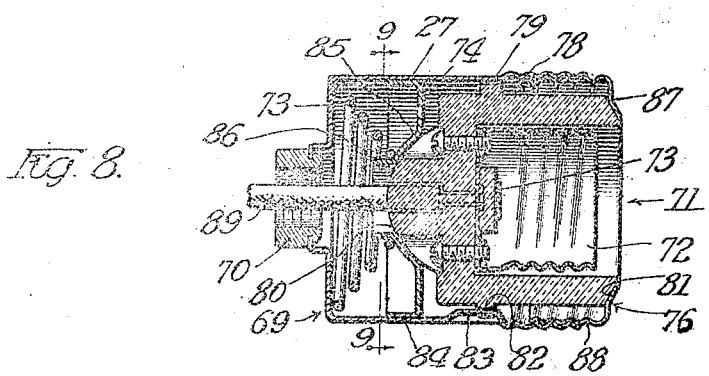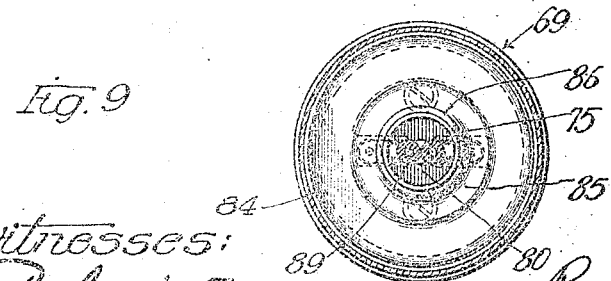

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ILLUMINATING DEVICE.

1,352,777.     Specification of Letters Patent.     Patented Sept. 14, 1920.

Application filed January 18, 1916. Serial No. 72,699.

*To all whom it may concern:*

Be it known that I, REUBEN B. BENJAMIN, a citizen of the United States, residing at Chicago, in the county of Cook and State of Illinois, have invented new and useful Improvements in Illuminating Devices, of which the following is a full, clear, concise, and exact description, reference being had to the accompanying drawing, forming a part of this specification.

My invention relates to illuminating devices, and more specifically to such devices having a concave reflector for projecting the light. In certain types of reflectors it is desirable to have the source of light adjustable with respect to the reflector so that the rays will be reflected in the proper direction. Thus in a parabolic reflector if the reflected rays are to be parallel it is essential that the source of light be located at the focus of the parabola, so that, unless there is some capacity for adjustment of the light with respect to the reflector, it would often happen that when the parts were assembled the source of light would not be in focus and the rays would not be reflected in the desired direction.

Among the objects of my invention is to provide an improved device in which the light may be quickly and easily adjusted, which shall be simple in construction and efficient.

Further objects will appear from the detailed description to follow taken in connection with the appended claims.

In the drawings, in which several embodiments of the invention are shown—

Figure 1 is a vertical section through an illuminating device embodying my invention;

Fig. 2 is a vertical section of the receptacle and associated parts;

Fig. 7 is a vertical section through a modified form of an illuminating device in which the axis of the receptacle is inclined;

Fig. 8 is an axial section of a modified form of receptacle; and

Fig. 9 is a section on the line 9—9 of Fig. 8.

Figure 3:
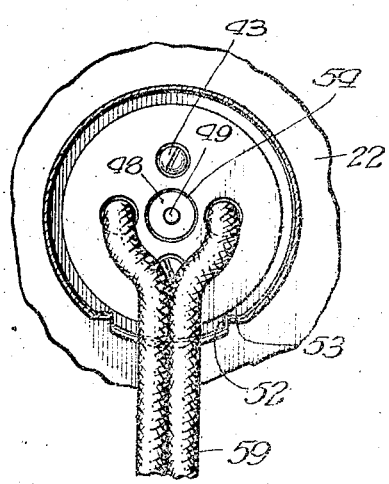
Fig. 3 is a section on the line 3—3 of Fig. 2.
Figure 4:
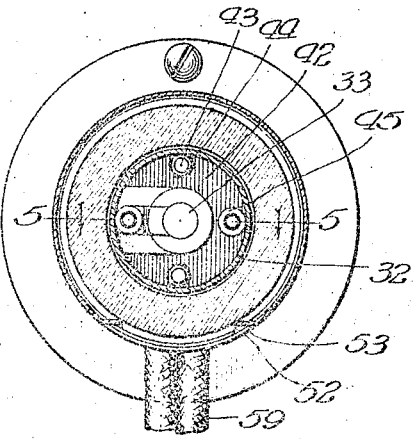
Fig. 4 is a section on the line 4—4 of Fig. 2.
Figure 5:
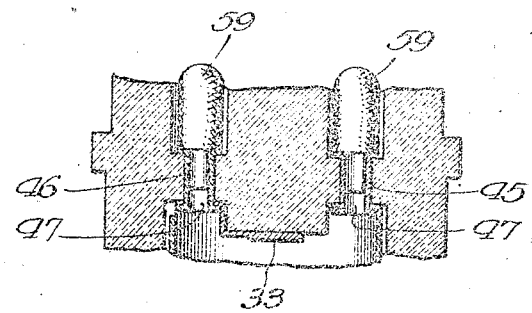
Fig. 5 is a section on the line 5—5 of Fig. 4.
Figure 6:
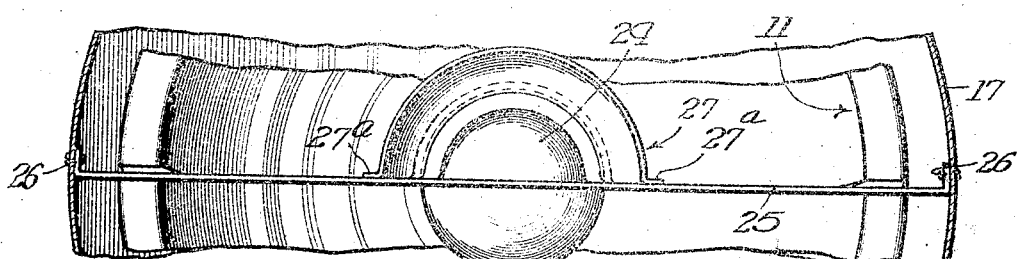
Fig. 6 is a section on the line 6—6 of Fig. 1.

Referring to the drawings in detail and first to the form of Figs. 1 to 6 inclusive, the illuminating device here shown comprises a casing 10, a reflector 11 in the casing, a receptacle 12 supported within the casing, and an electric lamp 13 supported in the receptacle and lying within the reflector. The casing 10 and reflector 11 may be similar to the corresponding parts of devices now in use, such as headlights for electric railway cars in which it is desirable that the reflected rays be as nearly parallel to each other as possible, so that a strong light will be thrown for a long distance. The casing 10 comprises a base portion 14 for supporting it in proper position on the car, a cylindrical shell portion 15 surrounding the receptacle and reflector, a rear supporting plate 16 to which the receptacle 12 is secured, a frame 17 in which the front glass 18 is secured, the frame being hinged at 19 to the casing to permit the frame to be swung up to allow access to the interior of the casing. The reflector 11 is secured within the casing 10 by means of screws 20 and comprises a parabolic portion 21 for reflecting the rays parallel to each other, and a spherical portion 22 substantially concentric with the source of light, and has an opening 23 at its rear end to receive the front end of the receptacle 12.

For the purpose of preventing certain of the direct rays from the lamp from escaping from the reflector 11 in an upward direction certain auxiliary reflectors may be mounted on the hinged frame 17. Two such reflectors are shown, a semi-conical reflector 24 formed integrally with an elongated plate 25, the ends of which are secured at 26 to the frame 17, and a second semi-conical reflector 27 secured at 27ª to the plate 25 and comprising a forwardly flaring portion 28, and a rearwardly flaring portion 29. The rear edge of the flaring portion 29 is located so as to intercept all of the upwardly projected direct rays which would otherwise escape in front of the forward edge of the reflector 11. The rear edge of the reflector 24 is so located as to intercept practically all of the direct rays which might otherwise be projected upwardly in front of the forward edge of the forwardly flaring portion 28 of the reflector 27. The inner surfaces of the reflector portions 24 and 27 are provided with reflecting surfaces so that the rays of light A and B incident thereon are reflected as indicated at C and D in a direction where they will be useful.

The receptacle 12 comprises a casing 30 supported by the plate 16, an insulating base 31 tiltably and slidably mounted in the casing 30, shell and center contacts 32 and 33 supported by the base 31, a threaded adjusting thumb ring 34 for adjusting the base 31 and holding it in adjusted position, and a spring 35 for holding the base 31 against the adjusting ring 34.

The casing 30 comprises a cylindrical portion 36 surrounding the base 31 and having an opening 37 to accommodate the leading in wires, a threaded portion 38 with which the ring 34 engages, and a retaining plate 39 on which the spring 35 seats secured to the flange portion 40 of the casing by means of eyelets 41. The shell contact 32 comprises a flange portion 42 secured to the base 31 by means of screws 43, nuts 44 and an eyelet 45, and a threaded shell portion 45ᵃ for engagement with the correspondingly threaded contact of the lamp base. The center contact 33 is secured to the base 31 by means of an eyelet 46. The ends of the leading in wires may be connected mechanically and electrically to the eyelets 45 and 46, as indicated at 47, in any suitable manner as by soldering. The end of the spring 35 engages a collar 48 secured on the pin 49, the rounded end 50 of which engages the insulating base 31 so that the base can readily tilt about this rounded end portion as a center. The insulating base 31 comprises a guide flange 51 which engages the cylindrical portion 36 of the casing and is recessed as shown at 52 (Fig. 4) to engage the stamped in portions 53 of the casing 30 to prevent the insulating base 31 from rotating within the casing when the lamp is screwed into the receptacle, and is recessed at 54 to receive the bearing pin 49, and is provided with a spherical portion 55 substantially concentric with the rounded end portion 50 of the pin 49, for engagement with the inner edge of the threaded adjusting ring 34. The casing 30 may be secured to the supporting plate 16 by means of screws 56 extending through the eyelets 41 and through openings in the supporting plate and nuts 57 threaded on the screws 56. A bushing 58 may be provided for the leading in wires 59 at the point where they enter the casing 10.

To adjust the light the hinged frame 17 carrying the reflectors 24 and 27 is thrown up out of the way and the insulating base 31 is adjusted slidably and tiltably until the rays are reflected in the desired direction. The sliding movement of the base 31 is effected by screwing the thumb ring 34 in or out, the spring 35 holding the base against the thumb ring. The tilting movement of the base 31 is effected by taking hold of the bulb of the lamp 13 and shifting it in the desired direction, causing the base 31 to tilt about the end 50 of the pin 49, the spherical portion 55 of the base engaging the inner edge of the thumb ring 34 permitting this adjustment and frictionally holding the base in the position to which it is adjusted.

In the modification shown in Fig. 7 the receptacle 12 and lamp 13 are substantially the same as in the form shown in Figs. 1 to 6. In the modification of Fig. 7, however, the receptacle 12 is supported within the casing 60 in an inclined position by means of a bracket 61 secured to the casing and to which the casing 30 of the receptacle is secured. A reflector 62 is supported in the casing 60 and comprises a parabolic portion 63 for directing the reflected rays parallel to each other, and a spherical portion 64 substantially concentric with the source of light for reflecting the rays incident thereon back through the lamp bulb onto the parabolic portion 63 of the reflector. A plate 65 may be provided as an additional support for the reflector.

In order to utilize the upwardly directed rays of light which do not fall on the reflector 62 a plurality of reflectors 66, 67 and 68 are provided which may be secured to the casing 60 in any suitable manner. The rear edge of the reflector 66 is positioned so that it will intercept the rays from the lamp 13 which would otherwise pass upwardly in front of the reflector 67, and the rear edge of the semi-cylindrical reflector 67 is positioned so that it will intercept the rays which would otherwise pass in front of the front edge of the reflector 68. The rear edge of the reflector 68 is positioned so that it will intercept those rays which would otherwise pass out in front of the reflector 62. The receptacle 12 is so located that the lamp 13 may be inserted without removing the reflectors 66, 67 and 68.

In the form shown in Figs. 8 and 9 the receptacle is of a type which may be screwed onto a threaded conduit in which the leading in wires are located. This receptacle comprises a casing 69, a bushing 70 for supporting the casing 69 and for screwing onto the end of a threaded conduit, an insulating base 71 slidably and tiltably mounted in the casing 69, shell and center contacts 72 and 73 supported by the base 71, a guide and bearing plate or follower 74 slidably mounted in the casing 69 and bearing on the insulating base 71, a spring 75 engaging the bearing plate 74 for holding the latter firmly against the base 71, and a threaded thumb ring 76 for slidably adjusting the base 71 and holding it in adjusted position. The casing 69 comprises a cylindrical portion 77 surrounding the insulating base and the bearing plate and spring, and a threaded portion 78 for engagement with the thumb ring 76. The insulating base 71 comprises an integral flanged portion 79 for engaging the casing 69, a spherical portion 80 for engagement with the bearing plate 74, and a spherical portion 81 for engagement with the thumb ring 76. The flanged portion 79 is recessed at 82 to receive a longitudinally extending rib 83 struck up from the casing 69. The spherical portions 80 and 81 are concentric with each other so that the insulating base 71 has, in effect, a ball and socket connection with the casing 69. The bearing plate 74 has an annular flange portion 84 for engaging the casing 69 for properly positioning the plate, a spherical cup portion 85 for engagement with the spherical portion 80 of the insulating base, and an annular flange portion 86 for holding in place the coiled spring 75. The thumb ring 76 comprises a spherical portion 87 for engagement with the spherical portion 81 of the insulating base, and a threaded portion 88 for engagement with the threaded portion 78 of the casing. The leading in wires 89 pass through the bushing 70 through the center opening into the bearing plate 74 and may be permanently secured in electrical connection with the center and shell contacts 72 and 73 substantially as in the form shown in Fig. 5. In this form the insulating base 71 may be slidably adjusted in the casing 69 by screwing the thumb ring 76 in or out, the spring 75 holding the base in any position to which it may be adjusted, and the insulating base may be tiltably adjusted in the casing by taking hold of the lamp which is screwed into the shell contact 72 and tilting it in the desired direction.

Having thus described my invention what I claim as new and desire to secure by Letters Patent is:—

1. A receptacle for electric lamps comprising an insulating base, a casing for said base, means for adjustably supporting said base for universal movement in said casing, and means mounted on said base and movable therewith for electrical connection with a lamp and for mechanically securing said lamp to said base to move therewith.

2. A receptacle for electric lamps comprising an insulating base, a casing for said base, means for adjustably supporting said base for tilting and bodily movement in said casing, and means mounted on said base and movable therewith for electrical connection with a lamp and for mechanically securing said lamp to said base to move therewith.

3. A receptacle for electric lamps comprising an insulating base, means for supporting said base for universal movement and for frictionally holding it in adjusted position, and means mounted on said base and movable therewith for electrical connection with a lamp and for mechanically securing said lamp to said base to move therewith.

4. A receptacle for electric lamps comprising an insulating base, a casing for said base, spring means for adjustably supporting said base in said casing and for frictionally holding it in adjusted position, and means mounted on said base and movable therewith for electrical connection with a lamp and for mechanically securing said lamp to said base to move therewith.

5. A receptacle for electric lamps comprising an insulating base, contacts supported thereby for engagement with lamp contacts, said base having a spherical portion, a casing for said base, and means for supporting said base in said casing for tilting and bodily movement comprising an adjustable ring having a portion engaging said spherical portion.

6. A receptacle for electric lamps comprising an insulating base, contacts supported thereby for engagement with lamp contacts, said base having a spherical portion, a casing for said base, and means for supporting said base in said casing for tilting and bodily movement comprising an adjustable ring having a portion engaging said spherical portion, said ring having a threaded engagement with said casing.

7. A receptacle for electric lamps comprising an insulating base, contacts supported thereby for engagement with lamp contacts, said base having a spherical portion, a casing for said base, means for supporting said base in said casing for tilting and bodily movement comprising an adjustable ring having a portion engaging said spherical portion, and spring means for holding said spherical portion against said ring.

8. A receptacle for electric lamps comprising an insulating base, a casing for said base, means for adjustably supporting said base in said casing, comprising an adjusting ring engaging said base, spring means for holding said base against said ring, and means mounted on said base and movable therewith for electrical connection with a lamp and for mechanically securing said lamp to said base to move therewith.

9. A receptacle for electric lamps comprising an insulating base, shell and center contacts supported thereby for engagement with lamp contacts, said base having a spherical portion, a casing for said base, means for supporting said base in said casing for tilting and bodily movement comprising an adjustable ring having a portion engaging said spherical portion, spring means for holding said spherical portion against said ring, and means for preventing rotation of said base in said casing about the axis of said shell contact.

10. A receptacle for electric lamps comprising an insulating base, a casing for said base, and means for adjustably supporting said base in said casing for movement in the direction in which the axis of said shell contact extends and also for tilting movement, and means mounted on said base and movable therewith for electrical connection with a lamp and for mechanically securing said lamp to said base to move therewith, comprising shell and center contacts for engagement with corresponding lamp contacts.

11. A receptacle for electric lamps comprising an insulating base, contacts supported thereby for engagement with lamp contacts, a casing for said base, and means for adjustably supporting said base in said casing for sliding and tilting movement, and means mounted on said base and movable therewith for electrical connection with a lamp and for mechanically securing said lamp to said base to move therewith.

12. The combination with a concave reflector, of a receptacle for electric lamps comprising an insulating base, means for adjustably supporting said base for universal movement with respect to said reflector, and means mounted on said base and movable therewith for electrical connection with a lamp and for mechanically securing said lamp to said base to move therewith.

13. The combination with a concave reflector, of a receptacle for electric lamps comprising an insulating base, means for adjustably supporting said base for tilting and bodily movement with respect to said reflector, and means mounted on said base and movable therewith for electrical connection with a lamp and for mechanically securing said lamp to said base to move therewith.

In witness whereof, I have hereunto subscribed my name.

REUBEN B. BENJAMIN.